(12) United States Patent
Park et al.

(10) Patent No.: US 12,014,880 B2
(45) Date of Patent: Jun. 18, 2024

(54) MULTILAYERED CAPACITOR AND BOARD HAVING THE SAME MOUNTED THEREON

(71) Applicant: SAMSUNG ELECTRO-MECHANICS CO., LTD., Suwon-si (KR)

(72) Inventors: Yong Park, Suwon-si (KR); Jong Ho Lee, Suwon-si (KR); Woo Chul Shin, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/979,919

(22) Filed: Nov. 3, 2022

(65) Prior Publication Data

US 2023/0046899 A1    Feb. 16, 2023

Related U.S. Application Data

(63) Continuation of application No. 16/831,272, filed on Mar. 26, 2020, now abandoned.

(30) Foreign Application Priority Data

Jul. 10, 2019    (KR) .................. 10-2019-0082983

(51) Int. Cl.
*H01G 4/30*    (2006.01)
*H01G 2/02*    (2006.01)
(Continued)

(52) U.S. Cl.
CPC .............. *H01G 4/30* (2013.01); *H01G 2/02* (2013.01); *H01G 4/012* (2013.01); *H01G 4/1209* (2013.01)

(58) Field of Classification Search
CPC ............ H01G 4/30; H01G 2/02; H01G 4/012; H01G 4/1209; H01G 4/232; H01G 4/1227
(Continued)

(56) References Cited

U.S. PATENT DOCUMENTS 5,841,626 A * 11/1998 Sano .................... H01G 4/1227
361/321.1
9,633,788 B2    4/2017 Fukunaga et al.
(Continued)

FOREIGN PATENT DOCUMENTS

CN    101320624 A    12/2008
CN    201196910 Y    2/2009
(Continued)

OTHER PUBLICATIONS

Office Action issued in corresponding Chinese Patent Application No. 202010484155.2 dated Aug. 25, 2021, with English translation.
(Continued)

*Primary Examiner* — Arun Ramaswamy
(74) *Attorney, Agent, or Firm* — Morgan, Lewis & Bockius LLP

(57) ABSTRACT

A multilayer capacitor includes a ceramic body including a dielectric layer, and having first to sixth surfaces, connected to the first surface to the fourth surface and opposing each other, a plurality of internal electrodes disposed inside the ceramic body, exposed to the fifth surface and the sixth surface, and having one ends exposed to the third surface or the fourth surface, and a first side margin portion and a second side margin portion disposed on end portions of the internal electrode, exposed to the fifth surface and the sixth surface, the first and second side margin portions are divided into an inner layer formed to be adjacent to the ceramic
(Continued)

body, and an outer layer formed on the inner layer, and a dielectric constant of the inner layer is lower than a dielectric constant of the outer layer.

25 Claims, 6 Drawing Sheets

(51) Int. Cl.
  *H01G 4/012* (2006.01)
  *H01G 4/12* (2006.01)
(58) Field of Classification Search
  USPC ............. 361/301.4, 321.1, 321.2, 321.5, 311
  See application file for complete search history.

(56) References Cited

U.S. PATENT DOCUMENTS

| | | | |
|---|---|---|---|
| 10,522,293 B2 | 12/2019 | Sakate et al. | |
| 2005/0111163 A1 | 5/2005 | Ito et al. | |
| 2007/0253140 A1* | 11/2007 | Randall | H01G 4/30 361/300 |
| 2008/0304204 A1 | 12/2008 | Suzuki | |
| 2009/0073635 A1 | 3/2009 | Taniguchi | |
| 2010/0142120 A1 | 6/2010 | Azuma et al. | |
| 2010/0165541 A1 | 7/2010 | Sasabayashi et al. | |
| 2012/0083402 A1 | 4/2012 | Hidaka et al. | |
| 2015/0027764 A1* | 1/2015 | Lee | H01G 4/30 29/25.42 |
| 2015/0340155 A1 | 11/2015 | Fukunaga et al. | |
| 2016/0172107 A1 | 6/2016 | Yoon et al. | |
| 2016/0196918 A1 | 7/2016 | Hong et al. | |
| 2017/0169952 A1 | 6/2017 | Kato et al. | |
| 2017/0243697 A1 | 8/2017 | Mizuno et al. | |
| 2017/0365410 A1 | 12/2017 | Morita et al. | |
| 2018/0061575 A1 | 3/2018 | Mizuno | |
| 2018/0108482 A1* | 4/2018 | Kogure | H01G 4/224 |
| 2018/0151295 A1* | 5/2018 | Iwai | H01G 2/065 |
| 2018/0197682 A1 | 7/2018 | Yamada et al. | |
| 2018/0233284 A1 | 8/2018 | Tanigushi | |
| 2018/0261390 A1 | 9/2018 | Sakate et al. | |
| 2018/0301281 A1 | 10/2018 | Park et al. | |
| 2018/0315549 A1 | 11/2018 | Ueda | |
| 2019/0035554 A1* | 1/2019 | Inomata | H01G 4/12 |
| 2019/0115153 A1 | 4/2019 | Park et al. | |
| 2019/0172643 A1 | 6/2019 | Cha | |
| 2019/0180936 A1 | 6/2019 | Cha et al. | |

FOREIGN PATENT DOCUMENTS

| | | |
|---|---|---|
| CN | 105097282 A | 11/2015 |
| CN | 107093530 A | 8/2017 |
| CN | 108735507 A | 11/2018 |
| CN | 109872874 A | 6/2019 |
| CN | 109950042 A | 6/2019 |
| JP | 2003-338427 A | 11/2003 |
| JP | 2009-044017 A | 2/2009 |
| JP | 2011-009369 A | 1/2011 |
| JP | 2016-1721 A | 1/2016 |
| JP | 2016-113355 A | 6/2016 |
| JP | 2017-112163 A | 6/2017 |
| JP | 2017-147358 A | 8/2017 |
| JP | 2017-147429 A | 8/2017 |
| JP | 2018-133501 A | 8/2018 |
| JP | 2018-148118 A | 9/2018 |
| JP | 2018-170526 A | 11/2018 |
| JP | 2019-102798 A | 6/2019 |
| KR | 10-2015-0134274 A | 12/2015 |
| KR | 10-2017-0142854 A | 12/2017 |
| KR | 10-2018-0083244 A | 7/2018 |
| KR | 10-2018-0102998 A | 9/2018 |
| KR | 10-2019-0041846 A | 4/2019 |

OTHER PUBLICATIONS

Office Action dated Oct. 24, 2023 in the related Japanese Patent Application No. 2020-107068 with English translation.
Office Action issued on Feb. 5, 2024, in the corresponding Korean Patent Application No. 10-2019-0082983 with English translation.
Office Action issued on Apr. 15, 2024 in Chinese Patent Application No. 202210385740.6.

\* cited by examiner

MULTILAYERED CAPACITOR AND BOARD HAVING THE SAME MOUNTED THEREON

CROSS-REFERENCE TO RELATED APPLICATION(S)

This application is the continuation application of U.S. patent application Ser. No. 16/831,272 filed on Mar. 26, 2020, which claims the benefit of priority to Korean Patent Application No. 10-2019-0082983 filed on Jul. 10, 2019 in the Korean Intellectual Property Office, the disclosure of which is incorporated herein by reference in its entirety.

TECHNICAL FIELD

The present disclosure relates to a multilayer capacitor and a mounting substrate thereof.

BACKGROUND

In general, electronic components using a ceramic material such as capacitors, inductors, piezoelectric elements, varistors, thermistors, or the like, include a ceramic body formed of a ceramic material, an internal electrode formed in a body, and an external electrode installed on a surface of the ceramic body to be connected to the internal electrode.

In recent years, due to the trend for miniaturization and multifunctionalization of electronic products, chip components have led to the tendency of miniaturization and high functionality. Therefore, a multilayer capacitor is required to be a high-capacity product having a small size and high capacity.

For miniaturization and high capacity of a multilayer capacitor, an increase in an effective volume fraction required for implementing the capacity is required by maximizing an electrode effective area.

In order to implement a small and high capacity multilayer capacitor as described above, in manufacturing a multilayer capacitor, an inner electrode is exposed in a width direction of a body, so an area of the inner electrode in a width direction is maximized through the marginless design. Moreover, after such a chip is manufactured, in an operation before sintering, a margin portion is additionally attached to an exposed surface of an electrode in a width direction of a chip.

However, when a multilayer capacitor is manufactured as described above, according to the related art, while a dielectric composition for formation of a side margin portion does not differentiate from a dielectric composition of a ceramic body, the dielectric composition of the ceramic body is used as it is.

Insulation breakdown, one of the major defects of a multilayer capacitor, is caused by an electric field concentrated on a tip of the internal electrode.

In order to prevent the insulation breakdown, one of the major defects of a multilayer capacitor, an electric field, concentrated on a tip of the internal electrode, should be relaxed.

Therefore, research is needed to mitigate the effects of an electric field being concentrated on a tip of the internal electrode.

SUMMARY

An aspect of the present disclosure is to provide a multilayer capacitor with improved reliability and a mounting substrate thereof.

According to an aspect of the present disclosure, a multilayer capacitor includes: a capacitor body including a dielectric layer, and having a first surface and a second surface, opposing each other, a third surface and a fourth surface, connecting the first surface to the second surface, and a fifth surface and a sixth surface, connected to the first surface to the fourth surface and opposing each other; a plurality of internal electrodes disposed inside the capacitor body, exposed to the fifth surface and the sixth surface, and having one ends exposed to the third surface or the fourth surface; first and second external electrodes disposed on the third surface and the fourth surface of the capacitor body; and a first side portion and a second side portion disposed on end portions of the internal electrode, exposed to the fifth surface and the sixth surface, the first and second side portions are divided into an inner layer formed to be adjacent to the capacitor body, and an outer layer formed on the inner layer, and a dielectric constant of the inner layer is lower than a dielectric constant of the outer layer.

The first and second side portions may be provided with a ratio of a dielectric constant of the inner layer to a dielectric constant of the outer layer equal to or less than 0.5.

The first and second side portions may be provided with a ratio of an average thickness of the inner layer to an average thickness of the outer layer of 0.08 to 0.15.

An average thickness of the dielectric layer may be equal to or less than 0.4 μm, and an average thickness of the internal electrode may be equal to or less than 0.41 μm.

An average thickness of the first and second side portions may be equal to or less than 10 μm.

The stacking number of the internal electrodes may be 400 or more layers.

Each of upper and lower cover areas of the capacitor body may be equal to or less than 20 μm.

An average thickness of the first and second external electrodes may be equal to or less than 10 μm.

The first and second side portions may be provided with an inner layer and an outer layer having thicknesses different from each other.

Each of the first and second external electrodes may include: first and second connecting portions disposed on the third surface and the fourth surface of the capacitor body, respectively, and connected to the internal electrode; and first and second band portions extended onto portions of the first surface of the capacitor body from the first and second connecting portions.

According to another aspect of the present disclosure, a mounting substrate of a multilayer capacitor includes: a substrate having first and second electrode pads on one surface; and the multilayer capacitor described above, mounted to allow first and second external electrodes to be connected to the first and second electrode pads, respectively.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
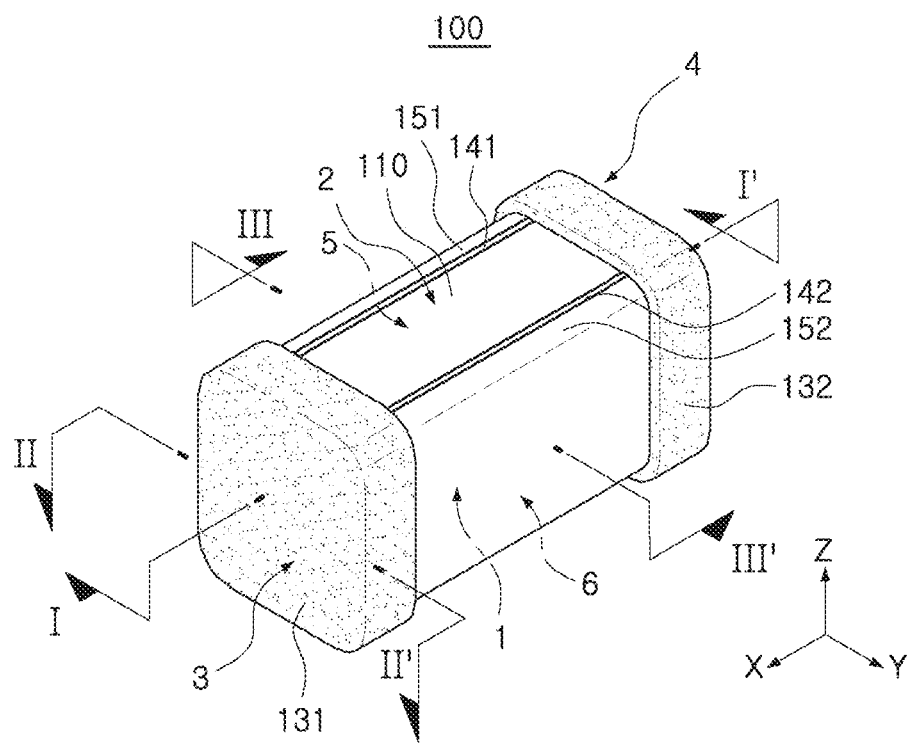
FIG. 1 is a schematic perspective view of a multilayer capacitor according to an embodiment.

Hereinafter, embodiments of the present disclosure will be described as follows with reference to the attached drawings. The shape and size of constituent elements in the drawings may be exaggerated or reduced for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
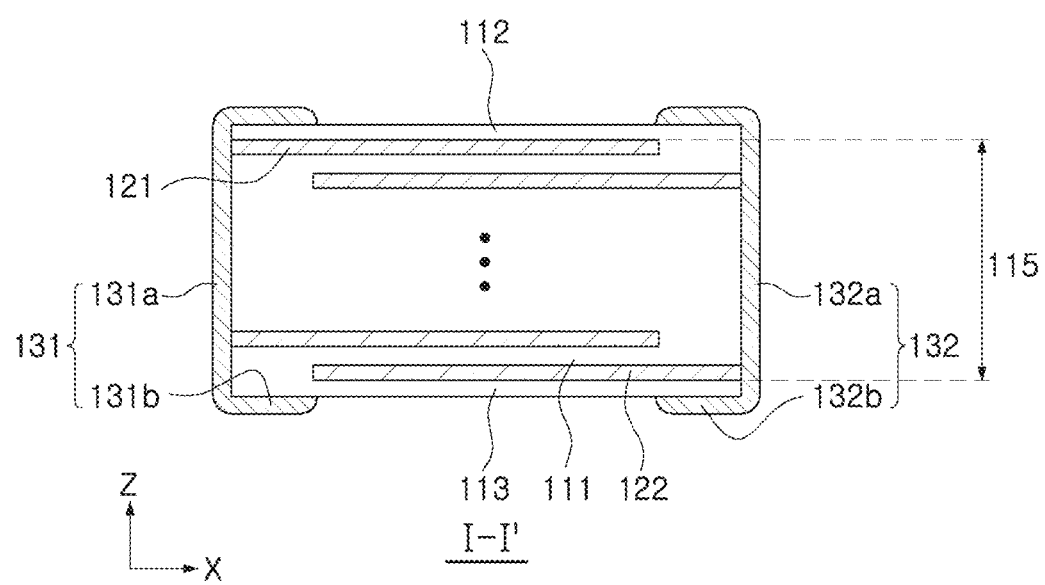
FIG. 2 is a cross-sectional view taken along line I-I' of FIG. 1.
Figure 3A:
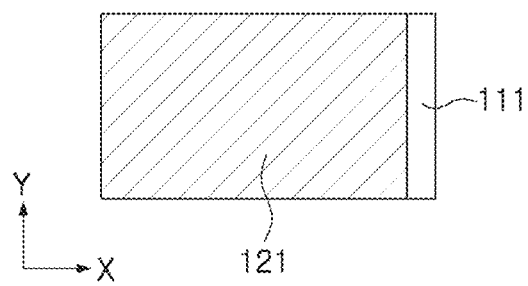
FIGS. 3A and 3B are plan views illustrating first and second internal electrodes, respectively, applied to the multilayer capacitor of FIG. 1.
Figure 3B:
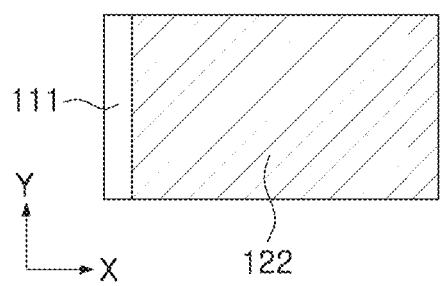
Figure 4:
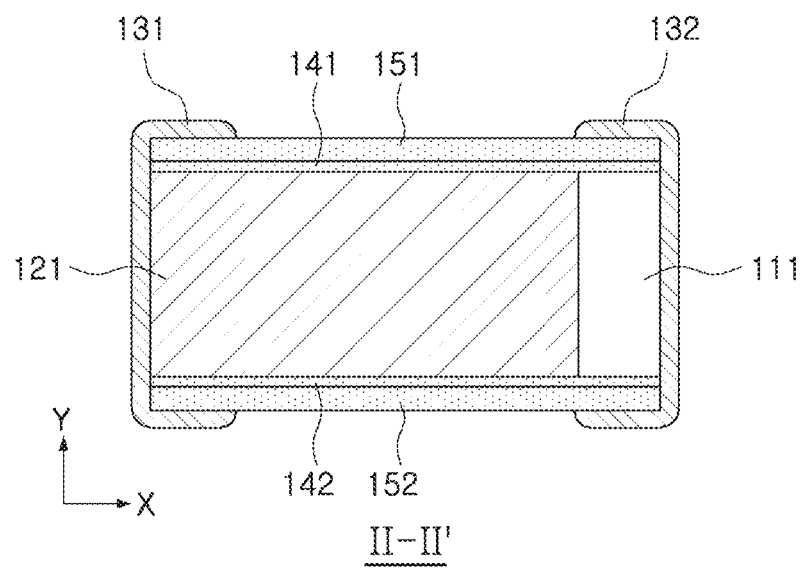
FIG. 4 is a cross-sectional view taken along line II-II' of FIG. 1.
Figure 5:
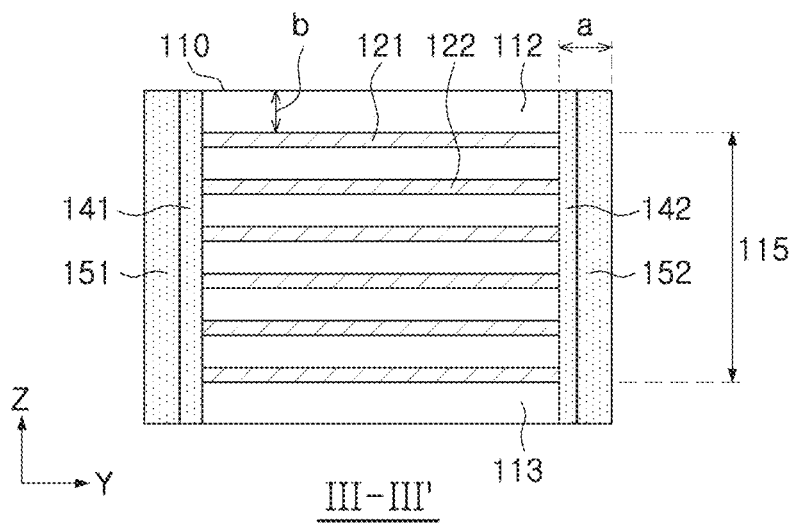
FIG. 5 is a cross-sectional view taken along line III-III' of FIG. 1.

FIG. 1 is a schematic perspective view of a multilayer capacitor according to an embodiment, FIG. 2 is a cross-sectional view taken along line I-I' of FIG. 1, FIGS. 3A and 3B are plan views illustrating first and second internal electrodes, respectively, applied to the multilayer capacitor of FIG. 1, FIG. 4 is a cross-sectional view taken along line I-I' of FIG. 1, and FIG. 5 is a cross-sectional view taken along line II-II' of FIG. 1.

When orientations are defined to clearly describe an embodiment in the present disclosure, X, Y, and Z on the drawings indicate a length direction, a width direction, and a thickness direction of a multilayer capacitor, respectively.

Moreover, in an embodiment, a Z direction may be used as having the same meaning as a stacking direction in which dielectric layers are stacked on each other.

Referring to FIGS. 1 to 5, a multilayer capacitor 100 according to an embodiment includes a capacitor body 110, a plurality of internal electrodes, first and second side portions, and first and second external electrodes 131 and 132 formed on an outer surface of the capacitor body 110.

In addition, the capacitor body 110 includes an active area 115 and upper and lower cover areas 112 and 113.

In this case, the first and second side portions are divided into first and second inner layers 141 and 142, formed to be adjacent to the capacitor body 110, and first and second outer layers 151 and 152, formed on the first and second inner layers 141 and 142, and dielectric constants of the first and second inner layers 141 and 142 are lower than dielectric constants of the first and second outer layers 151 and 152.

The plurality of dielectric layers 111, forming the capacitor body 110, are stacked in the Z direction and then sintered, and adjacent dielectric layers 111 of the capacitor body 110 are integrated so that boundaries therebetween are not readily apparent without using a scanning electron microscope (SEM).

In addition, the capacitor body 110 includes a plurality of dielectric layers 111 and first and second internal electrodes 121 and 122 have different polarities and alternately arranged in the Z direction with the dielectric layer 111 interposed therebetween.

Moreover, the capacitor body 110 may include an active area 115 as a portion contributing to the formation of the capacity of a capacitor, and upper and lower cover areas 112 and 113 as margin portions. In the active area, the first and second internal electrodes 121 and 122 are alternately disposed in the Z direction with the dielectric layer 111 interposed therebetween. The upper and lower cover areas are provided on upper and lower surfaces of the active area 115 in the Z direction, respectively.

In this case, each of the upper and lower cover areas 112 and 113 of the capacitor body 110 may be equal to or less than 20 μm.

If each of the upper and lower cover areas 112 and 113 of the capacitor body 110 exceeds 20 μm, a size spec of a designed multilayer capacitor is exceeded, so there may be a problem in that a multilayer capacitor forms high capacity.

The capacitor body 110, described above, has a shape without limitation, and may have a hexahedral shape, and may include a first surface 1 and a second surface 2, opposing each other in the Z direction, a third surface 3 and a fourth surface 4, connected to the first surface 1 and the second surface 2 and opposing each other in the X direction, and a fifth surface 5 and a sixth surface 6, connected to the first surface 1 and the second surface 2, connected to the third surface 3 and the fourth surface 4 and opposing each other in the Y direction. In this case, the first surface 1 may be a mounting surface.

The dielectric layer 111 may include ceramic powder, for example, $BaTiO_3$-based ceramic powder, or the like.

Moreover, the $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca or Zr is partially dissolved in $BaTiO_3$, but an embodiment of the present disclosure is not limited thereto.

Moreover, a ceramic additive, an organic solvent, a plasticizer, a binder, a dispersant, and the like may also be added to the dielectric layers 111 along with the ceramic powder.

The ceramic additive may include, for example, a transition metal oxide or a transition metal carbide, a rare earth element, magnesium (Mg), aluminum (Al), or the like.

The first and second internal electrodes 121 and 122 are electrodes to which different polarities are applied, are formed on the dielectric layer 111 and stacked on the Z direction, and may be arranged alternately to oppose each other in the Z direction inside the capacitor body 110 with a single dielectric layer 111 interposed therebetween.

In this case, the first and second internal electrodes 121 and 122 may be electrically isolated from each other by the dielectric layers 111 interposed therebetween.

Moreover, the first internal electrode 121 is exposed through the third surface 3, the fifth surface 5, and the sixth surface 6, of the capacitor body 110. In this case, the first internal electrode 121 may also be exposed through a corner connecting the third surface 3 to the fifth surface 5 of the capacitor body 110 and a corner connecting the third surface 3 to the sixth surface 6 of the capacitor body 110.

The second internal electrode 122 is exposed through the fourth surface 4, the fifth surface 5, and the sixth surface 6, of the capacitor body 110. In this case, the second internal electrode 122 may also be exposed through a corner connecting the fourth surface 4 to the fifth surface 5 of the capacitor body 110 and a corner connecting the fourth surface 4 to the sixth surface 6 of the capacitor body 110.

In this case, end portions of the first and second internal electrodes 121 and 122, alternately exposed through the third surface 3 and the fourth surface 4 of the capacitor body 110, may be in contact with and connected to the first and second external electrodes 131 and 132, disposed on both end portions of the capacitor body 110 in the X direction, to be described later.

According to the above configuration, when a predetermined voltage is applied to the first and second external electrodes 131 and 132, charges are accumulated between the first and second internal electrodes 121 and 122.

In this case, the capacitance of the multilayer capacitor 100 is proportional to an area of overlap between the first and second internal electrodes 121 and 122, overlapping each other in the Z direction in the active area 115.

In an embodiment, when the first and second internal electrodes 121 and 122 are configured, not only basic areas of the first and second internal electrodes 121 and 122 are expanded, but also the capacity of the multilayer capacitor 100 may be increased by increasing a vertically overlapped area.

Moreover, a stepped portion caused by an internal electrode may be reduced, so the accelerated life of insulation resistance may be improved. Thus, a multilayer capacitor with excellent capacity characteristics and improved reliability may be provided.

In this case, a material, forming the first and second internal electrodes 121 and 122, is not particularly limited. For example, the first and second internal electrodes may be formed using a precious metal material or a conductive paste formed of at least one between nickel (Ni) and copper (Cu).

In addition, a method of printing the conductive paste such as screen printing or gravure printing may be used, but an embodiment of the present disclosure is not limited thereto.

Moreover, the first and second internal electrodes 121 and 122 may have average thicknesses D, equal to or less than 0.4 μm.

If the average thickness of the first and second internal electrodes 121 and 122 exceeds 0.4 μm, it is difficult to improve the capacity of the multilayer capacitor 100.

Moreover, the stacking number of the first and second internal electrodes 121 and 122 may be 400 or more layers.

The first side portion is disposed on the fifth surface 5 of the capacitor body 110, while the second side portion is disposed on the sixth surface 6 of the capacitor body 110.

The first and second side portions are in contact with front ends to cover the front ends of portions exposed through the fifth surface 5 and the sixth surface 6 of the capacitor body 110 in the first and second internal electrodes 121 and 122.

The first and second side portions may serve to protect the capacitor body 110 and the first and second internal electrodes 121 and 122 from an external impact, and to secure insulation properties and moisture resistance reliability around the capacitor body 110.

The first side portion includes a first inner layer 141 adjacent to the fifth surface 5 of the capacitor body 110 and a first outer layer 151 formed on the first inner layer 141.

In addition, a dielectric constant of the first inner layer 141 may be lower than a dielectric constant of the first outer layer 151.

The second side portion includes a second inner layer 142 adjacent to the sixth surface 6 of the capacitor body 110 and a second outer layer 152 formed on the second inner layer 142.

In addition, a dielectric constant of the second inner layer 142 may be lower than a dielectric constant of the second outer layer 152.

Moreover, in the first and second side portions, a ratio of dielectric constants of the first and second inner layers 141 and 142 to dielectric constants of the first and second outer layers 151 and 152 may be equal to or less than 0.5.

In this case, if the ratio of dielectric constants of the first and second inner layers 141 and 142 to dielectric constants of the first and second outer layers 151 and 152 exceeds 0.5, a difference in dielectric constants between layers is not significant. Thus, since the first and second outer layers 151 and 152 and the first and second inner layers 141 and 142 are included in a high dielectric constant region to cause electric field concentration, so a problem may occur in that a generation rate of shorts is increased.

The electric field is orthogonal to a surface of a conductor in a general direction, and the electric field inside the conductor with equipotentiality is canceled out to 0 within the conductor.

When a neutral conductor penetrates between electrodes with the potential difference, charges in the conductor are rearranged according to the nature of the conductor.

The neutral conductor with rearranged charges has the same effect as an electrode, and has the effect of reducing a distance between electrodes. Thus, strength of the electric field is increased as shown in the equation below.

$$V = -\oint E \cdot dl \qquad \text{[Equation 1]}$$

Thus, when dielectric constants of the first and second inner layers 141 and 142 are lower than dielectric constants of the first and second outer layers 151 and 152, an electric field is lowered to lower the probability of dielectric breakdown, so reliability of a multilayer capacitor may be improved.

In this case, due to the first and second side portions, when a ratio of dielectric constants of the first and second inner layers 141 and 142 to dielectric constants of the first and second outer layers 151 and 152 is equal to or less than 0.5, an electric field is further lowered, so reliability of a multilayer capacitor may be further increased.

Moreover, an average thickness of the first and second side portions may be equal to or less than 10 μm.

As the capacitor body 110 becomes smaller, a thickness of a side portion may further affect electrical characteristics of the multilayer capacitor 100.

According to an embodiment of the present disclosure, an average thickness of first and second side portions is formed to be equal to or less than 10 μm, so characteristics of a miniaturized multilayer capacitor may be improved.

That is, as the average thickness of first and second side portions is formed to be equal to or less than 10 μm, a maximum overlapping area of internal electrodes, forming the capacity, is secured, so a high capacity and small multilayer capacitor may be implemented.

Moreover, in the first and second side portions, average thicknesses of the first and second inner layers 141 and 142 and the first and second outer layers 151 and 152 may be different.

At an interface between a layer formed of a high dielectric constant material and a low dielectric constant material, refraction of an electric field occurs. When an electric field moves from a layer with a high dielectric constant to a layer with a low dielectric constant, a speed of the electric field is increased, so an amount of field offset becomes smaller and thus an angle of refraction becomes larger than an angle of incidence of the electric field. When an electric field moves from a layer with a low dielectric constant to a layer with a high dielectric constant, a speed of the electric field is decreased, so an amount of field offset becomes larger and thus an angle of refraction becomes smaller than an angle of incidence of the electric field.

Here, the capacitor body 110 has a dielectric constant. Due to the principle described above, a multilayer capacitor according to an embodiment is a combination in which a high dielectric constant, a low dielectric constant, and a high dielectric constant are arranged in this order. Thus, an electric field is concentrated in the first and second inner layers 141 and 142 having a low dielectric constant by the refracted electric field.

Therefore, in the first and second side portions, when thicknesses of the first and second inner layers 141 and 142 and an average thickness of the first and second outer layers 151 and 152 are different, a size of an electric field may be reduced. In detail, when thicknesses of the first and second outer layers 151 and 152 are greater than thicknesses of the first and second inner layers 141 and 142, a phenomenon in which an electric field is concentrated may be significantly reduced, so an overall electric field is reduced to further improve reliability of a multilayer capacitor.

Voltages having different polarities are provided for the first and second external electrodes 131 and 132, and the first and second external electrodes are disposed in both end portions of the body 110 in the X direction and are in contact with and connected to portions exposed through the third surface 3 and the fourth surface 4 of the capacitor body 110 in the first and second internal electrodes 121 and 122.

The first external electrode 131 may include a first connection portion 131a and a first band portion 131b.

The first connecting portion 131a is disposed on the third surface 3 of the capacitor body 110, and in contact with an end portion exposed externally through the third surface 3 of the capacitor body 110 in the first internal electrode 121 to physically and connect the first internal electrode 121 to the first external electrode 131.

The first band portion 131b is a portion extended from the first connecting portion 131a to a portion of the first surface 1 of the capacitor body 110.

In this case, the first band portion 131b is further extended to the second surface 2, the fifth surface 5, and the sixth surface 6 of the capacitor body 110 to improve adhesion strength if required, so as to cover one end portion of the first and second side portions 141 and 142.

The second external electrode 132 may include a second connection portion 132a and a second band portion 132b.

The second connecting portion 132a is disposed on the fourth surface 4 of the capacitor body 110, and in contact with an end portion exposed externally through the second surface 4 of the capacitor body 110 in the second internal electrode 122 to physically and connect the second internal electrode 122 to the second external electrode 132.

The second band portion 132b is a portion extended from the second connecting portion 132a to a portion of the first surface 1 of the capacitor body 110.

In this case, the second band portion 132b is further extended to the second surface 2, the fifth surface 5, and the sixth surface 6 of the capacitor body 110 to improve adhesion strength if required, so as to cover the other end portion of the first and second side portions 141 and 142.

Moreover, an average thickness of the first and second external electrodes 131 and 132 may be equal to or less than 10 μm.

If the average thickness of the first and second external electrodes 131 and 132 exceeds 10 μm, a size spec of a designed multilayer capacitor is exceeded, so there may be a problem in that a multilayer capacitor forms the high capacity.

Moreover, according to an embodiment, an ultra-small multilayer capacitor is provided. Here, an average thickness of dielectric layers 111 is equal to or less than 0.4 μm, and an average thickness of the first and second internal electrodes 121 and 122 is equal to or less than 0.41 μm.

Here, the meaning of a thin film is not that a thickness of the dielectric layer 111 is equal to or less than 0.4 μm and thicknesses of the first and second internal electrodes 121 and 122 are equal to or less than 0.41 μm, and may be understood as the concept of including the dielectric layer and the internal electrode, having a reduced thickness, as compared with the product according to the related art.

Moreover, in the first and second side portions, a ratio of an average thickness of the first and second inner layers 141 and 142 to an average thickness of the first and second outer layers 151 and 152 may be 0.08 to 0.15.

If the ratio of an average thickness of the first and second inner layers 141 and 142 to an average thickness of the first and second outer layers 151 and 152 is less than 0.08, an E-Field value converges and a thickness is reduced, so there may be a problem in that a dielectric function is not sufficiently performed.

If the ratio of an average thickness of the first and second inner layers 141 and 142 to an average thickness of the first and second outer layers 151 and 152 exceeds 0.15, an electric field is included in a region with a high dielectric constant, so there may be a problem in that a short rate is increased.

Thus, when the ratio of an average thickness of the first and second inner layers 141 and 142 to an average thickness of the first and second outer layers 151 and 152 is set between 0.08 and 0.15, a short defect rate may be significantly reduced.

On a Y-Z plane, a dielectric layer may include nickel (Ni) particles or a nickel oxide.

Figure 6:
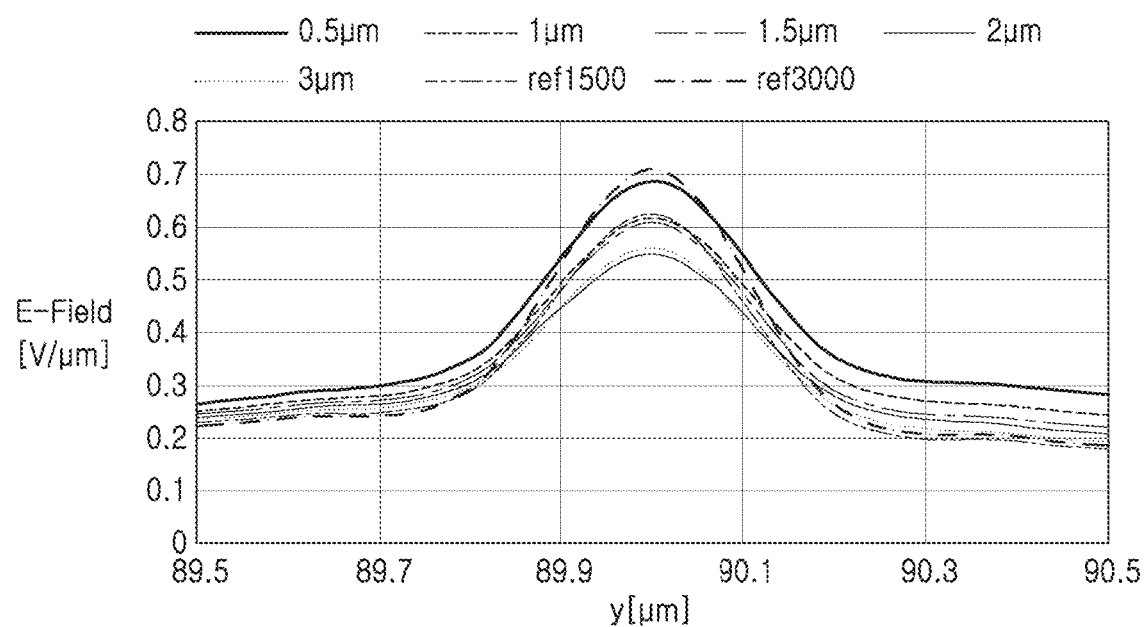
FIG. 6 is a graph illustrating an electric field according to a size of a Ni particle.

FIG. 6 is a graph illustrating an electric field according to a size of a nickel particle or a nickel oxide contained in such a dielectric layer, and y-coordinates represent modeling coordinates in Maxwell in FIG. 6.

A size of a nickel particle or a nickel oxide, remaining in a dielectric layer, is required to be smaller than a dielectric layer in order to prevent shorts from occurring. In this experiment, a thickness of a dielectric layer is 5 µm, and a maximum diameter of a nickel particle or a nickel oxide is 4 µm.

That is, FIG. 6 represents an electric field according to a thicknesses of an inner layer of a side portion at a position of y=90 µm, and the electric field is reduced as y moves away from 90 µm.

As compared with the case in which a side portion is formed of a single layer with a low dielectric constant, an electric field of a side portion formed of a double layer in an embodiment is further smaller. In addition, when a thickness of an inner layer of a side portion is equal to or more than 2 µm, convergence occurs, so an optimal thickness may be set.

Thus, in the first and second side portions, a ratio of an average thickness of the first and second inner layers 141 and 142 to an average thickness of the first and second outer layers 151 and 152 may preferably be 0.08 to 0.15.

Figure 7:
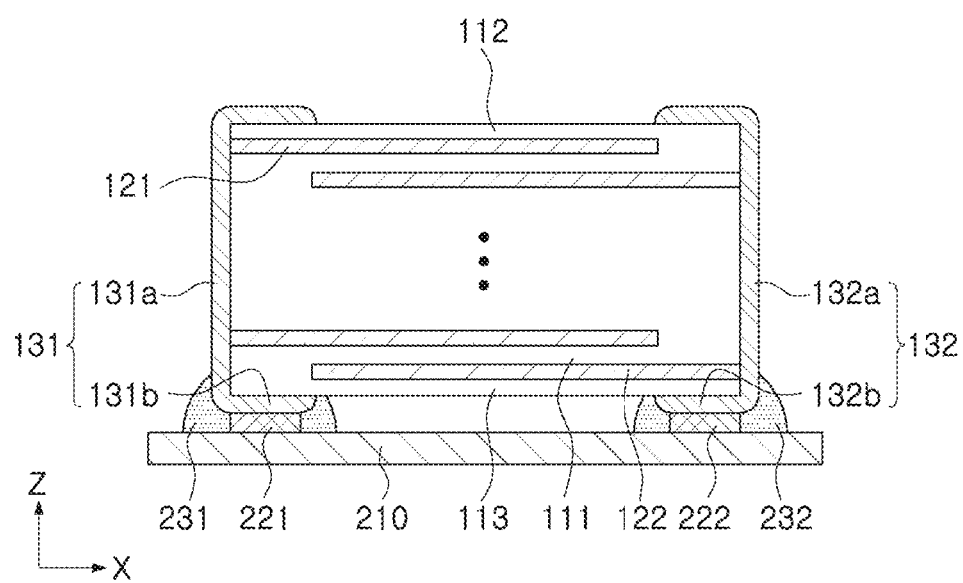
FIG. 7 is a schematic cross-sectional view illustrating the multilayer capacitor of FIG. 2 mounted on a substrate.

Referring to FIG. 7, a mounting substrate of a multilayer capacitor according to an embodiment includes a substrate 210 having first and second electrode pads 221 and 222 on one surface, as well as a multilayer capacitor 100 mounted to connect first and second external electrodes 131 and 141 to the first and second electrode pads 221 and 222, respectively, on an upper surface of the substrate 210.

In an embodiment, although the multilayer capacitor 100 is illustrated and described as being mounted on the substrate 210 by solders 231 and 232, a conductive paste may be used instead of solder if necessary.

As set forth above, according to an embodiment in the present disclosure, as dielectric constants between an inner layer and an outer layer of a side portion are different, refraction of an electric field occurs at an interface, so reliability of a multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor, comprising:
a capacitor body including a dielectric layer, and having a first surface and a second surface, opposing each other, a third surface and a fourth surface, connecting the first surface to the second surface and opposing each other, and a fifth surface and a sixth surface, connected to the first, second, third and fourth surfaces and opposing each other;
a plurality of internal electrodes disposed inside the capacitor body, exposed to the fifth surface and the sixth surface, and having one ends exposed to the third surface or the fourth surface;
first and second external electrodes disposed on the third surface and the fourth surface of the capacitor body, respectively; and
a first side portion and a second side portion disposed on end portions of the internal electrode, exposed to the fifth surface and the sixth surface, respectively,
wherein the first and second side portions are each divided into an inner layer formed to be adjacent to the capacitor body, and an outer layer formed on the inner layer, and a dielectric constant of the inner layer is lower than a dielectric constant of the outer layer and a dielectric constant of the dielectric layer,
the inner layer is extended to the second surface from the first surface and extended to the fourth surface from the third surface, and the inner layer separates the capacitor body and the outer layer,
wherein the first and second side portions are provided with a ratio of a dielectric constant of the inner layer to a dielectric constant of the outer layer equal to or less than 0.5, and
wherein average thicknesses of the first and second side portions each is equal to or less than 10 µm.

2. The multilayer capacitor of claim 1, further comprising an upper cover area and a lower cover area each comprising a dielectric material, and disposed respectively above and below the uppermost internal electrode and lowermost internal electrode of the plurality of internal electrodes.

3. The multilayer capacitor of claim 1, wherein the first and second side portions are provided with a ratio of an average thickness of the inner layer to an average thickness of the outer layer of 0.08 to 0.15.

4. The multilayer capacitor of claim 1, wherein an average thickness of the dielectric layer is equal to or less than 0.4 µm, and an average thickness of the internal electrode is equal to or less than 0.41 µm.

5. The multilayer capacitor of claim 1, wherein a stacking number of the plurality of internal electrodes is 400 or more layers.

6. The multilayer capacitor of claim 2, wherein an average thickness of each of the upper and lower cover areas of the capacitor body is equal to or less than 20 µm.

7. The multilayer capacitor of claim 1, wherein average thicknesses of the first and second external electrodes each is equal to or less than 10 µm.

8. The multilayer capacitor of claim 1, wherein the dielectric constant of the inner layer is less than a dielectric constant of the capacitor body.

9. The multilayer capacitor of claim 1, wherein each of the first and second external electrodes includes:
first and second connecting portions disposed on the third surface and the fourth surface of the capacitor body, respectively, and connected to the internal electrode; and
first and second band portions extended onto portions of the first surface of the capacitor body from the first and second connecting portions.

10. A multilayer capacitor, comprising:
a capacitor body including a dielectric layer, and having a first surface and a second surface, opposing each other, a third surface and a fourth surface, connecting the first surface to the second surface and opposing each other, and a fifth surface and a sixth surface, connected to the first, second, third and fourth surfaces and opposing each other;
a plurality of internal electrodes disposed inside the capacitor body, exposed to the fifth surface and the sixth surface, and having one ends exposed to the third surface or the fourth surface;
first and second external electrodes disposed on the third surface and the fourth surface of the capacitor body, respectively; and
a first side portion and a second side portion disposed on end portions of the internal electrode, exposed to the fifth surface and the sixth surface, respectively,
wherein the first and second side portions are each divided into an inner layer formed to be adjacent to the capacitor body, and an outer layer formed on the inner layer, and a dielectric constant of the inner layer is less than or equal to half of a dielectric constant of the dielectric layer,
the inner layer is extended to the second surface from the first surface and extended to the fourth surface from the third surface, and the inner layer separates the capacitor body and the outer layer,
wherein the first and second side portions are provided with a ratio of an average thickness of the inner layer to an average thickness of the outer layer of 0.08 to 0.15, and
wherein average thicknesses of the first and second side portions each is equal to or less than 10 μm.

11. The multilayer capacitor of claim 10, further comprising an upper cover area and a lower cover area each comprising a dielectric material, and disposed respectively above and below the uppermost internal electrode and lowermost internal electrode of the plurality of internal electrodes.

12. The multilayer capacitor of claim 10, wherein an average thickness of the dielectric layer is equal to or less than 0.4 μm, and an average thickness of the internal electrode is equal to or less than 0.41 μm.

13. The multilayer capacitor of claim 10, wherein a stacking number of the plurality of internal electrodes is 400 or more layers.

14. The multilayer capacitor of claim 11, wherein an average thickness of each of the upper and lower cover areas of the capacitor body is equal to or less than 20 μm.

15. The multilayer capacitor of claim 10, wherein average thicknesses of the first and second external electrodes each is equal to or less than 10 μm.

16. The multilayer capacitor of claim 10, wherein the dielectric constant of the inner layer is less than a dielectric constant of the capacitor body.

17. The multilayer capacitor of claim 10, wherein each of the first and second external electrodes includes:
first and second connecting portions disposed on the third surface and the fourth surface of the capacitor body, respectively, and connected to the internal electrode; and
first and second band portions extended onto portions of the first surface of the capacitor body from the first and second connecting portions.

18. A multilayer capacitor, comprising:
a body comprising first and second internal electrodes stacked in a thickness direction with a dielectric layer interposed between each pair of first and second internal electrodes, the first internal electrodes being exposed to a third surface of the body and spaced apart from a fourth surface of the body opposing the third surface in a length direction and the second internal electrodes being exposed to the fourth surface and spaced apart from the third surface;
a first external electrode disposed on the third surface and connected to the first internal electrodes;
a second external electrode disposed on the fourth surface and connected to the second internal electrodes; and
first and second side portions disposed respectively on fifth and sixth surfaces of the body opposing each other in a width direction, each of the first and second side portions comprising an inner layer contacting edges of the first and second internal electrodes in the width direction, and an outer layer disposed on the inner layer and having an average thickness greater than that of the inner layer,
wherein a dielectric constant of the inner layer is lower than a dielectric constant of the outer layer and a dielectric constant of the dielectric layer, and the inner layer is extended to the lower surface from the upper surface of the body in the thickness direction and is extended to the fourth surface from the third surface, and the inner layer separates the body and the outer layer, and the first and second side portions are provided with a ratio of a dielectric constant of the inner layer to a dielectric constant of the outer layer equal to or less than 0.5.

19. The multilayer capacitor of claim 18, wherein the dielectric constant of the inner layer is less than a dielectric constant of the body.

20. The multilayer capacitor of claim 18, further comprising an upper cover layer and a lower cover layer each comprising a dielectric material, and disposed respectively above and below the uppermost internal electrode and lowermost internal electrode of the first and second internal electrodes.

21. The multilayer capacitor of claim 20, wherein each of the upper and lower cover layers has an average thickness less than or equal to 20 μm.

22. The multilayer capacitor of claim 18, wherein each of the first and second internal electrodes has an average thickness less than or equal to 0.41 μm.

23. The multilayer capacitor of claim 18, wherein the dielectric layer has an average thickness less than or equal to 0.4 μm.

24. The multilayer capacitor of claim 18, wherein the dielectric layer contains nickel particles or a nickel oxide.

25. A mounting substrate of a multilayer capacitor, comprising:
a substrate having first and second electrode pads on one surface; and the multilayer capacitor according to claim 1 mounted to allow the first and second external electrodes to be connected to the first and second electrode pads, respectively.

\* \* \* \* \*